United States Patent [19]

Lance

[11] Patent Number: 5,685,606
[45] Date of Patent: Nov. 11, 1997

[54] ADJUSTABLE LUMBAR SUPPORT

[75] Inventor: Mark Andrew Lance, Williamstown, Australia

[73] Assignee: Henderson's Industries Pty Ltd., Australia

[21] Appl. No.: 702,667

[22] PCT Filed: Mar. 10, 1995

[86] PCT No.: PCT/AU95/00123

§ 371 Date: Sep. 9, 1996

§ 102(e) Date: Sep. 9, 1996

[87] PCT Pub. No.: WO95/24144

PCT Pub. Date: Sep. 14, 1995

[30] Foreign Application Priority Data

Mar. 11, 1994 [AU] Australia ............... PM4430

[51] Int. Cl.[6] ............... A47C 3/025
[52] U.S. Cl. ............... 297/284.4; 297/284.1
[58] Field of Search ............... 297/284.1, 284.2, 297/284.3, 284.4, 284.8, 452.29, 452.3, 452.63

[56] References Cited

U.S. PATENT DOCUMENTS 3,608,960  9/1971  Sherman.

FOREIGN PATENT DOCUMENTS

| | | |
|---|---|---|
| 80449/82 A | 8/1983 | Australia. |
| 296938 A | 12/1988 | European Pat. Off.. |
| 3340718 A | 5/1984 | Germany. |
| 3817977 | 11/1989 | Germany. |
| 4314325 A | 11/1994 | Germany. |
| 1077189 | 7/1967 | United Kingdom. |
| 92/17096 A | 10/1992 | WIPO. |
| 92/21269 A | 12/1992 | WIPO. |
| 93/05683 A | 4/1993 | WIPO. |
| 94/08492 A | 4/1994 | WIPO. |
| 94/24904 | 11/1994 | WIPO. |

*Primary Examiner*—Milton Nelson, Jr.
*Attorney, Agent, or Firm*—Lerner, David, Littenberg, Krumholz & Mentlik

[57] ABSTRACT

An adjustable lumbar support for use in the backrest of a seat, the lumbar support having an elongate flexible band which extends longitudinally between the sides of the seat backrest and which has an effective length capable of variation so as to thereby vary the rearward curvature of the band when the lumbar support is in use. The band includes two parts which overlap in a region intermediate the length of the band and which are interconnected through a drive device including a rotatable cam. The cam interacts with the band parts in such a way that rotation of the cam causes a change in the degree of overlap between those parts and thereby changes the effective length of the band. The cam is contained in a housing and an actuator such as an electric motor can be mounted on that housing to form an integral part of the lumbar support assembly.

36 Claims, 3 Drawing Sheets

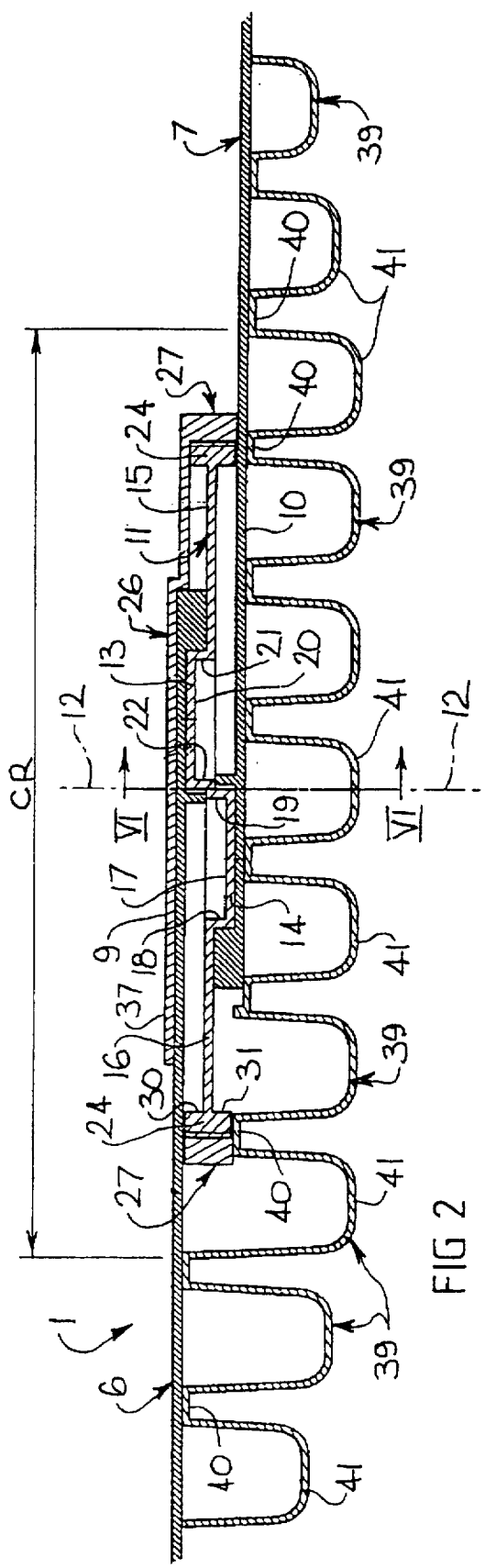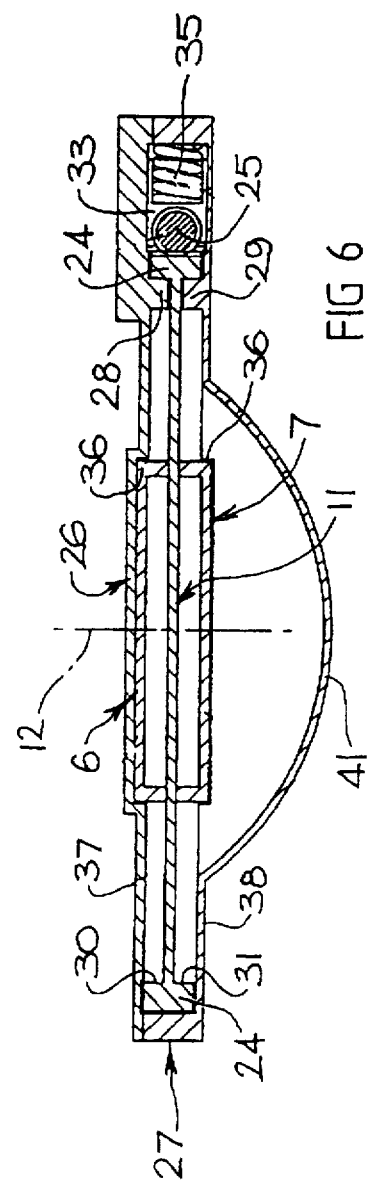

ADJUSTABLE LUMBAR SUPPORT

FIELD OF THE INVENTION

This invention relates to lumbar supports for use in the backrest of seats, chairs and the like. The invention is especially suited for use with vehicle seats, and it will be convenient to hereinafter describe the invention with particular reference to that example use. In that regard, the word "vehicle" is to be understood as embracing vehicles of all kinds including aircraft, waterborne vehicles and land vehicles.

BACKGROUND OF THE INVENTION

It is well known to provide adjustable lumbar supports in vehicle seats, and especially in the seat to be occupied by the vehicle driver. Such adjustable supports take a variety of forms, and the manner of achieving adjustment also varies widely. The adjustment is generally such that it varies the effective length of the support and/or its stiffness, and thereby influences the extent to which the support curves rearwards in response to pressure applied by the user of the vehicle seat. That is, the support may provide a relatively flat or a deeply curved support for the vehicle seat occupant, according to the level of adjustment of the effective length of the support.

Adjustment of the foregoing kind is sometimes referred to as fore and aft adjustment, which reflects the direction in which the support moves during adjustment under normal use conditions.

Adjustment of the effective length of the lumbar support requires drive means, which may be power driven (e.g., electric) or manually driven. In either case, an actuator is required and that is generally mounted on the seat frame or other support structure, and is connected to the lumbar support through a drive connection such as a flexible cable. Separate mounting of the actuator and the lumbar support adds to the inconvenience and cost of installing the lumbar support assembly.

Another problem encountered with lumbar supports as are currently available, is the need to impose relatively high forces as the lumbar support is adjusted from a deeply curved condition towards a relatively flat condition. The magnitude of the force required increases as the lumbar support flattens.

SUMMARY OF THE INVENTION

It is an object of the present invention to provide an improved lumbar support assembly in which at least part of the drive means for causing adjustment of the lumbar support is mounted on the lumbar support prior to attachment of that support to a seat frame. It is a further object of the invention to provide an improved lumbar support which minimises the forces necessary to adjust the support towards a relatively flat condition.

According to the present invention, there is provided a lumbar support assembly which is characterised in that it includes a flexible band or strap-like member having two relatively movable parts, and drive means which interconnects the two parts and is operable to cause relative movement of those parts in the longitudinal direction of the band so as to thereby cause an increase or a decrease in the effective length of the band. It is preferred that each of the two band parts is elongate and that the band parts overlap at a region of the band which is substantially midway between the ends of the band. The arrangement is such that changes in the extent of the overlap cause changes in the overall effective length of the band. It is further preferred that the drive means which interconnects the two band parts includes a rotatable cam which interacts with the two parts so as to vary the overlap according to the rotational position of the cam. The cam may be driven by an electric motor which is mounted on the band so as to be an integral part of the lumbar support assembly.

In a preferred embodiment of the invention, a series of projections is provided over a front face of the band, and adjacent projections are spaced apart in the longitudinal direction of the band. In one form, the projections adjacent each end of the band have a depth less than that of projections closer to the longitudinal mid-point of the band. Each projection has an outer surface which forms part of the front bearing surface of the band, and that is the surface which dictates whether a user of the lumbar support experiences a deeply curved or a relatively flat support. Preferably, the outer surface of each projection has a convex curvature in a direction transverse of the band.

The "depth" of a projection as referred to in the preceding paragraph and following passages of this specification, is the extent to which the projection extends outwardly from the main body of the band over which the projection is located. In one particular arrangement, the projections on each side of a central region of the series of projections, progressively decrease in depth in a direction away from that central region. Other arrangements could be used. The central region may be formed by a single projection, but it will be usually formed of two or more projections.

It is a feature of the last described aspect of the invention that the bearing surface which is formed by the combined effect of the front surfaces of the projections, is located forward of the main body of the band. It is that main body which is subjected to tension when the band is being adjusted towards a flatter configuration. Location of the bearing surface forward of that main body, and formation of the bearing surface so that it has greater forward projection at a central zone than at its ends, minimises the tensile forces on the main body of the band. That is because the bearing surface will have a relatively flat end to end configuration while the main body of the band has a relatively deeply curved configuration.

An embodiment of the invention is described in detail in the following passages of the specification which refer to the accompanying drawings. The drawings, however, are merely illustrative of how the invention might be put into effect, so that the specific form and arrangement of the various features as shown is not to be understood as limiting on the invention.

BRIEF DESCRIPTION OF THE DRAWINGS

In the drawings:

FIG. 2 is a sectional view taken along line II—II of FIG. 1 but showing the lumbar support band in a flattened rather than curved configuration.

FIG. 6 is a cross sectional view taken along line VI—VI of FIG. 2.

DETAILED DESCRIPTION OF THE PREFERRED EMBODIMENT

Figure 1:
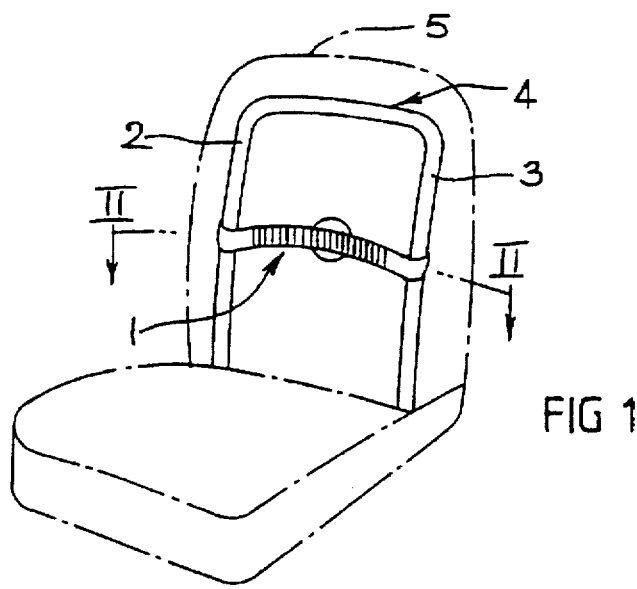
FIG. 1 is a diagrammatic view illustrating a seat to which a lumbar support according to the invention is attached.

A lumbar support of the kind to which the present invention applies, includes a flexible strap-like member or band 1 (FIG. 1). In use, the band 1 is arranged transverse between the side members 2 and 3 of the frame 4 of a seat backrest 5, as shown diagrammatically in FIG. 1, and the opposite ends of the band 1 can be attached to the side members 2 and 3 in any appropriate manner.

It is a feature of a lumbar support according to the invention that the band 1 includes two parts 6 and 7, which are best seen in FIG. 2. FIG. 2 shows the band 1 extending in a straight line, whereas it would be more correct to show the band 1 as having a curvature—for example, as shown diagrammatically by FIG. 3. The straight line configuration of FIG. 2 has been adopted for convenience of illustration.

Figure 3:
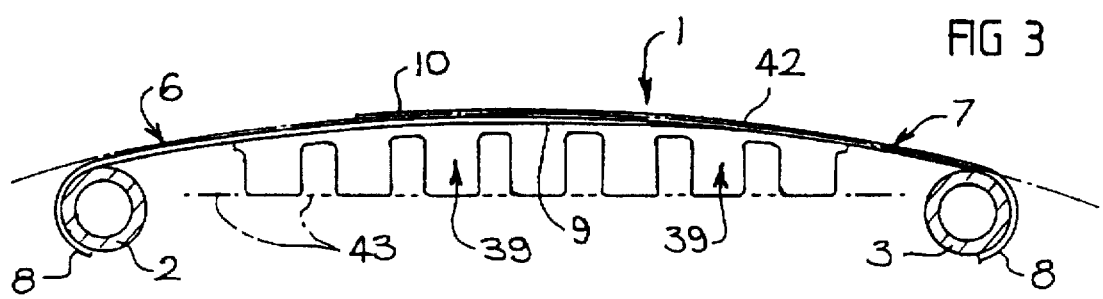
FIG. 3 is a diagrammatic plan view of one form of adjustable lumbar support in accordance with the invention.
Figure 4:
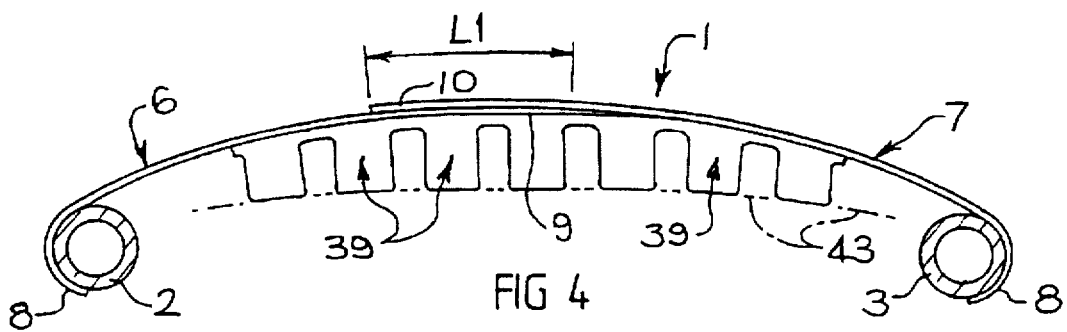
FIG. 4 is a view similar to FIG. 3 but showing the lumbar support in a different position of adjustment.
Figure 5:
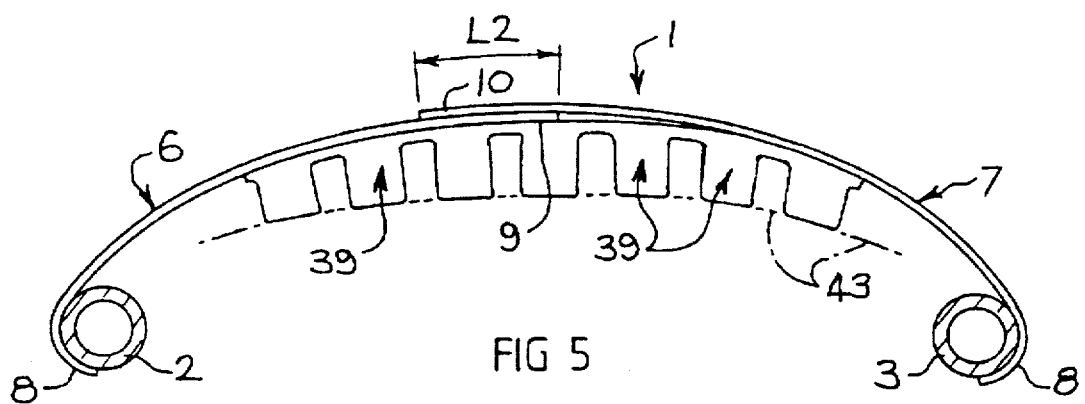
FIG. 5 is a view similar to FIG. 4 but showing the lumbar support in yet another position of adjustment.

In use, an outer end portion 8 of each of the band parts 6 and 7 is attached to a respective one of the frame members 2 and 3 (FIGS. 3, 4 and 5). The inner end portions of the two parts 6 and 7 overlap in the particular arrangement shown in the drawings, and in FIGS. 3, 4 and 5 of the drawings those end portions are identified by the reference numerals 9 and 10 respectively. In FIG. 4, the degree of overlap between the end portions 9 and 10 is represented by the distance "L1", and in FIG. 5 that distance has been reduced to "L2". A comparison of FIGS. 4 and 5 shows that the band 1 becomes more deeply curved as the extent of the overlap between the end portions 9 and 10 decreases. Conversely, the band 1 tends to flatten as that overlap increases towards the condition of maximum overlap as represented by FIG. 3.

Adjustment of the degree of overlap is effected through drive means, at least part of which is attached to or formed integral with the band 1. It is preferred that substantially the entire drive means forms part of the band 1 so that the band and drive means can be packaged, shipped and installed at the place of end use, as a single lumbar support assembly. Various forms of drive means could be adopted. In the particular example hereinafter described, the drive means actuator is in the form of an electric motor, and a drive connection between that motor and the band 1 converts rotary motion of the motor into relative linear motion of the band parts 6 and 7. That relative linear motion effects a change in overlap as referred to above.

It is preferred that the drive means includes a rotary cam which is attached to or supported by the band 1, and a cam follower attached to or formed integral with at least one of the band parts 6 and 7. In the particular arrangement shown, a separate cam follower is provided for each band part 6 and 7, but a single cam follower could be used. By way of example, a cam follower may be provided on or connected to one of the band parts 6 and 7, and not the other. Guide means may be provided to confine the band parts 6 and 7 to relative linear movement in the longitudinal direction of the band 1.

In the particular example shown by FIGS. 2 and 6 to 8, the cam is formed by a circular disc 11 having an axis of rotation which is represented by the line 12 in FIG. 2, and two camming members 13 and 14 provided on respective opposite sides of the disc 11. Each of the particular camming members 13 and 14 shown in the drawings is in the form of a cylindrical boss which projects axially from a respective side face 15 and 16 of the disc 11 and is located so as to be eccentric relative to the disc axis 12. Preferably, the two bosses 13 and 14 have their respective axes on diametrically opposite sides of the disc axis 12. The disc 11 may be moulded or otherwise formed from a suitable plastics material, and the bosses 13 and 14 may be formed integral (as shown) with the body of the disc 11.

It is to be understood that the camming members 13 and 14 need not have the form of a cylindrical boss. Each camming member, or the camming member if a single cam follower is used, can have any peripheral shape as desired to suit particular needs. By way of example, that shape may be selected so that the speed of response of the relevant band part varies according to the rotational position of the cam. In that regard, "speed of response" means the speed at which the effective length of the lumbar support changes in response to a unit of movement of the cam, and the cam movement could be either rotational or linear. Under some circumstances, it is desirable to have a relatively fast speed of response when the support is deeply curved—i.e., at or near the "full-off" condition—whereas a relatively slow speed of response may be desirable at or near the "full-on" or relatively flat condition of the support.

Figure 8:
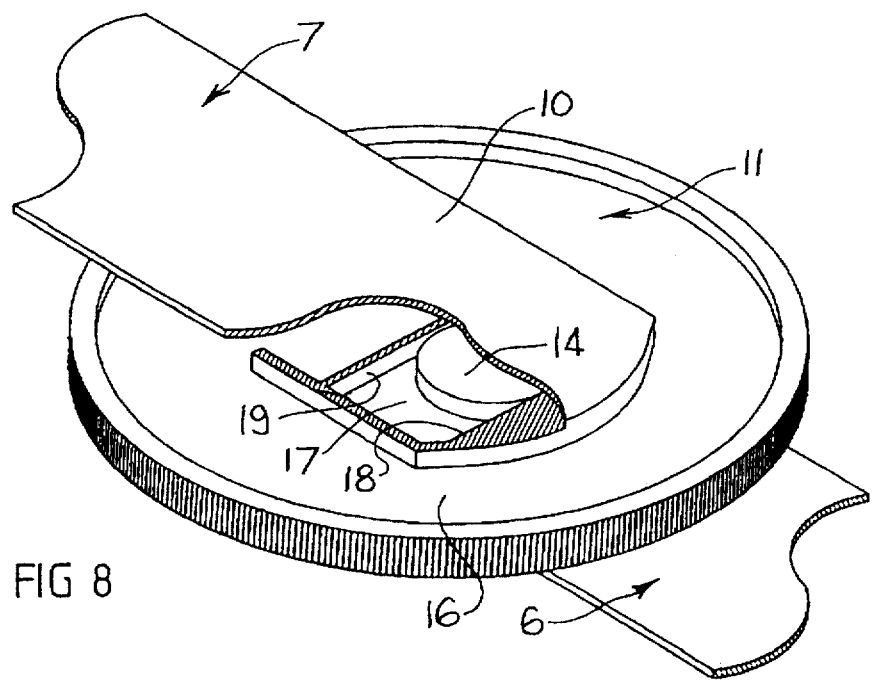
FIG. 8 is a view similar to FIG. 7 but showing the lumbar support from the opposite side, and certain parts have been omitted from that view for convenience of illustration.

Referring again to the particular arrangement shown in the drawings, a cam follower is provided at the inner end portion of each band part 6 and 7. One particular form of cam follower is shown in FIG. 8, and that is the cam follower of the band part 7. A cam follower of the same form is provided on the band part 6, and is visible in part in FIG. 2.

As best seen in FIG. 8, the cam follower of the band portion 7 includes a recess 17 formed in an undersurface of the band part 7. The recess 17 is in the form of a slot extending transverse to the longitudinal axis of the band 1, and which has a width substantially the same as the diameter of the boss 14. The arrangement is such that the boss 14 is slidable lengthwise of the recess 17 and moves from adjacent one end of the recess 17 to adjacent the other during a complete revolution of the disc 11. Because of the eccentric location of the boss 14, it pushes against the sides 18 and 19 of the recess 17 in alternating sequence as the disc 11 moves through a complete revolution.

The end portion 9 of the band part 6 has a recess 20 corresponding to the recess 17 of the band part 7 (FIG. 2), and the boss 13 pushes against sides 21 and 22 of the recess 20 during rotation of the disc 11. It is the interaction of each boss 13 and 14 with the sides of the respective recess 20 and 17, which causes the adjustment of the effective length of the band 1.

In the arrangement shown, rotation of the disc 11 is controlled by an electric motor 23 (FIG. 7) and a worm and worm wheel connection between the motor 23 and the disc 11. Other types of connections could be adopted, including a gear connection. A toothed rim 24 formed integral with or attached to the disc 11, forms the worm wheel, and a cooperative worm 25 is connected to the motor 23 so as to be driven by that motor.

The worm and worm wheel are retained within a housing 26 so as to have the desired cooperative engagement. The housing 26 includes a hollow circular section 27 which contains the disc 11 and restricts radial movement of that disc whilst permitting the disc 11 to rotate relative to the housing 26. It is preferred that curved ribs 28 and 29 are provided on respective opposite sides of the housing section 27 to function as centering guides or bearings for the disc 11. The ribs 28 and 29 have a radially outer curvature which is substantially complimentary to the diameter of a radially inner surface 30 and 31 respectively of the toothed rim 24. The arrangement is such that the ribs 28 and 29 engage the surfaces 30 and 31 to hold the disc axis 12 against substantial radial deviation, with the result that the disc 11 does not require to be supported at its center by a bearing or the like. It will be appreciated that other centerless bearing arrangements could be adopted.

Figure 7:
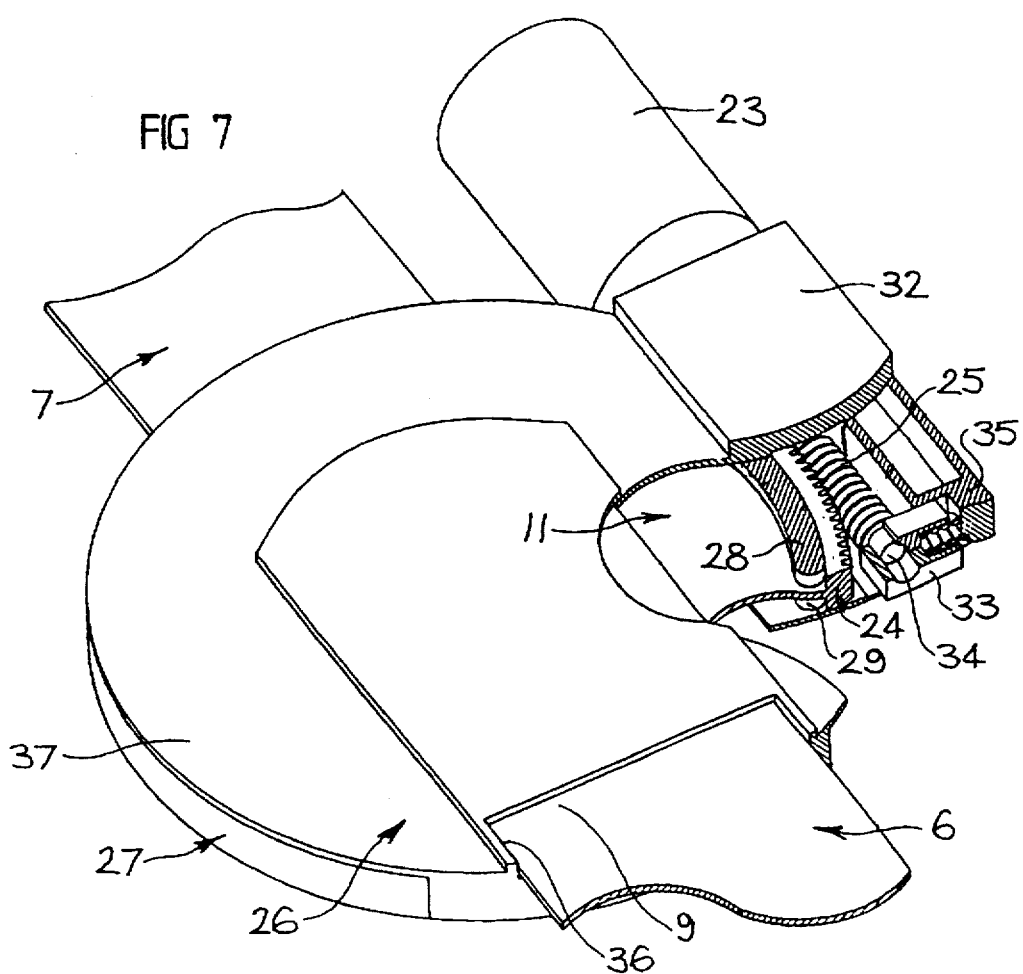
FIG. 7 is a perspective view of part of the lumbar support of FIG. 2.

As best seen in FIG. 7, the worm 25 is rotatably mounted in a block section 32 of the housing 26. It is preferred that the worm 25 is resiliently urged into engagement with the toothed rim 24 so as to allow the worm 25 to "float" as necessary to compensate for variations in the profile of the toothed rim 24. In the particular arrangement shown, that is achieved by a plunger bearing 33 which rotatably contains an axial extension 34 of the worm 25 and which is movable relative to the disc 11 in a direction generally radial of that disc. The bearing 33 may be resiliently urged towards the disc 11 by a compression spring 35 as shown, but that is not essential.

Guide means is preferably provided to keep the end portions 9 and 10 of the band part 6 and 7 to a line of relative movement which is substantially parallel to the longitudinal axis of the band 1. In the arrangement shown, that guide means is provided by forming a slot 36 of appropriate width and direction on the inside surface of each of the opposite side walls 37 and 38 of the housing section 27 (FIG. 6). Each of the slots 36 is arranged to slidably receive a respective one of the end portions 9 and 10.

Another feature of the particular construction shown in the drawings, is the provision of profile projections 39 on the front side of the band 1. In the particular arrangement shown, the projections 39 are formed as an integral series which is connected to or formed integral with the housing wall 38 (FIG. 6). Each projection 39 in the series is connected to adjacent projections 39 through an integral web 40 (FIG. 2) which acts something in the manner of a hinge as hereinafter described, and as indicated above at least some of those webs 40 could form part of the wall 38. In practice not all of the webs 40 will act in the manner of a hinge. The support will be relatively rigid across the lateral extent of the housing 26, and consequently the hinge effect may be confined to those parts of the band 1 which extend beyond opposite sides of the housing 26.

Each projection 39 could have any suitable shape or configuration. In the particular arrangement shown, each is in the form of a rib which has its longitudinal axis extending transverse to the longitudinal axis of the band 1. Also, the front surface 41 of each projection has a convex curvature in the direction of its longitudinal axis, as best seen in FIG. 6. Each projection 39 is spaced laterally from adjacent projections 39 so that the series of projections has a flexibility which permits it to readily adapt to changes in the curvature of the main body of the band 1 which is formed by the parts 6 and 7.

Each projection 39 extends forwardly of the general plane of the main body of the band 1 which is represented by the line 42 in FIG. 3. The line 43 in FIG. 3 represents the plane which contains the front surfaces 41 of the projections 39, and the combined effect of those surfaces 41 is to form the forward active or bearing surface of the lumbar support. That bearing surface is therefore also represented by the line 43, and it is the surface which determines the nature of the support given to the user of the associated seat. That is, the user will experience a deeply curved or a relatively flat support according to the end to end configuration of the surface 43.

Because of the forward location of the surface 43 relative to the general plane 42 of the band 1, the force necessary to flatten the lumbar support is less than would otherwise be the case. That is, the end to end configuration of the surface 43 could be relatively flat even though the plane 42 remains relatively deeply curved, and the configuration of the surface 43 is altered by varying the longitudinal tension to which the band 1 is subjected in the plane 42.

Not all projections 39 need extend forward of the plane 42 to the same degree. In the particular example shown by FIGS. 3 to 5, projections 39 at each end of the series of projections have a forward extent less than that of projections in a central region of the series. It is preferred that the projections on each side of the central region have a progressive reduction in forward extent, and that reduction occurs in a direction away from the central region.

In the particular arrangement shown in FIG. 2, the central region of the series of projections is that group of projections 39 between the limits of the line CR. Each projection 39 within that group extends forward of the plane 42 by substantially the same distance. The two projections 39 immediately adjacent respective opposite ends of the CR group extend forwardly to an extent less than the projections 39 within the group, and the final two projections 39 at respective opposite ends of the series extend forward to an even lesser extent. It is to be understood that the number of projections 39 within the group CR can be greater or less than that shown by FIG. 2, and the number of projections 39 located beyond each end of the group CR may be different to that shown in FIG. 2.

The variation in forward extent of the projections 39 assists in enabling the surface 43 to have a relatively flat configuration while the plane 42 is relatively deeply curved to the rear, but such variation is not essential. If desired, each projection 39 of the series of projections may extend substantially the same distance forwardly of the plane 42.

It will be apparent from the foregoing description that the present invention provides a relatively compact lumbar support assembly which is convenient to store, transport and install. The assembly is further improved by the fact that the force necessary to adjust the support into a relatively flat condition is less than that required for prior lumbar supports.

Various alterations, modifications and/or additions may be introduced into the constructions and arrangements of parts previously described without departing from the spirit or ambit of the invention as defined by the appended claims.

I claim:

1. An adjustable lumbar support for use with a seat backrest, said support including a flexible band having a longitudinal axis extending between two opposite ends of the band, each said end being attachable to a respective one of two sides of a said backrest, said band including two separate parts which are relatively movable in the direction of said longitudinal axis so as to thereby vary the effective length of said band each said part having an outer end and an inner end, each said outer end forms a respective one of said two opposite ends of said band and each said inner end is located between said two opposite ends, and drive means interconnecting the two said inner ends and being operable to cause relative movement of said inner ends and thereby cause said relative movement of said parts, said drive means including a cam which is rotatable relative to said band about an axis extending transverse to said band and which interacts with each of said parts so that said effective length is varied according to the rotational position of said cam relative to said parts.

2. An adjustable lumbar support according to claim 1, wherein said band parts overlap in a region of the band located substantially midway between said ends, and said drive means is operable to vary the extent of said overlap and thereby vary said effective length.

3. An adjustable lumbar support according to claim 1, wherein a housing is attached to said band, and at least part of said drive means is contained in said housing.

4. An adjustable lumbar support according to claim 1, wherein said cam includes a disk arranged to rotate about said axis, and at least one camming member attached to said disk for movement therewith, said camming member being located radially outwards of the rotational axis of said disk and cooperating with a cam follower provided on one of said band parts so as to cause said relative movement of the band parts in response to rotation of said disk.

5. An adjustable lumbar support according to claim 4, wherein a said camming member is provided on each of two opposite sides of said disk and each cooperates with a said cam follower of a respective one of said band parts.

6. An adjustable lumbar support according to claim 5, wherein the two said camming members are located on diametrically opposite sides of the disk rotational axis.

7. An adjustable lumbar support according to claim 1, wherein said cam is caused to rotate through a worm and worm wheel drive connection.

8. An adjustable lumbar support according to claim 7, wherein said cam has a circular series of worm teeth provided thereon so as to thereby form said worm wheel.

9. An adjustable lumbar support according to claim 7, wherein said worm is mounted so as to be movable along a path which is transverse of the rotational axis of the worm and is substantially radial of the rotational axis of the worm wheel, and resilient means resists movement of said worm along said path in one direction and urges the worm to move along said path in the direction opposite to said one direction so as to thereby cause said worm to cooperatively engage with the worm wheel.

10. An adjustable lumbar support according to claim 1 wherein a housing is attached to said band, said cam is contained in said housing, bearing means within said housing mounts said cam for rotation about the rotational axis thereof, and said bearing means includes at least one radially outwardly facing surface which slidably engages a radially inwardly facing bearing surface of the cam.

11. An adjustable lumbar support according to claim 10, wherein said radially inwardly facing surface is a surface adjacent to the radially outer periphery of the cam.

12. An adjustable lumbar support according to claim 10, wherein said cam is caused to rotate through a worm and worm wheel drive connection, and said worm is contained in said housing.

13. An adjustable lumbar support according to claim 12, wherein a housing is attached to said band, at least part of said drive means is contained in said housing, and an actuator is mounted on said housing.

14. An adjustable lumbar support according to claim 1, including an actuator which is connected to said drive means and is operative to cause operation of said drive means.

15. An adjustable lumbar support according to claim 14, wherein said actuator is an electric motor.

16. An adjustable lumbar support according to claim 1, wherein said band includes a series of projections which are spaced apart in the longitudinal direction of said band, each said projection extends forwardly from a base of the projection to an outer surface thereof, and each said outer surface forms a respective part of a front surface of the band.

17. An adjustable lumbar support according to claim 16, wherein the projection at each end of said series has a maximum distance between said base and said outer surface which is less than the corresponding said distance of at least one other said projection of the series.

18. An adjustable lumbar support according to claim 16, wherein there is a progressive decrease in a maximum distance on each side of a central region of said series.

19. An adjustable lumbar support according to claim 18, wherein at least two said projections are located within said central region.

20. An adjustable lumbar support according to claim 16, wherein each said projection is a rib having its longitudinal axis extending transverse to the longitudinal axis of the band.

21. An adjustable lumbar support according to claim 20, wherein each said outer surface has a convex curvature in the longitudinal direction of the respective said rib and the apex of that curvature is substantially midway in the longitudinal direction of the rib.

22. An adjustable lumbar support for use with a seat backrest, said support including a flexible band having a longitudinal axis extending between two opposite ends of the band, each said end being attachable to a respective one of two sides of a said backrest, said band including two separate parts which are relatively moveable in the direction of said longitudinal axis so as to thereby vary the effective length of said band, each said part including a respective one of said ends, and drive means interconnecting the two said parts and being operable to cause said relative movement of said parts, said drive means including a cam which is rotatable relative to said band about an axis extending transverse to said band and which interacts with each of said parts so that said effective length is varied according to the rotational position of said cam relative to said parts, said cam including a disk and at least one camming member attached to said disk for movement therewith, said camming member being located radially outwards of the rotational axis of the cam and cooperating with a cam follower provided on one of said band parts so as to cause said relative movement of the bands parts in response to rotation of said disk.

23. An adjustable lumbar support according to claim 22, wherein a said camming member is provided on each of two opposite sides of said disk and each cooperates with a said cam follower of a respective one of said band parts.

24. An adjustable lumbar support according to claim 23, wherein the two said camming members are located on diametrically opposite sides of the cam rotational axis.

25. An adjustable lumbar support for use with a seat backrest, said support including a flexible band having a longitudinal axis extending between two opposite ends of the band, each said end being attachable to a respective one of two sides of a said backrest, said band including two separate parts which are relatively moveable in the direction of said longitudinal axis so as to thereby vary the effective length of said band, each said part including a respective one of said ends, and drive means interconnecting the two said parts and being operable to cause said relative movement of said parts, said drive means including a cam which is rotatable relative to said band and which interacts with each of said parts so that said effective length is varied according to the rotational position of said cam relative to said parts, wherein said cam is caused to rotate through a worm and worm wheel drive connection.

26. An adjustable lumbar support according to claim 25, wherein said cam has a circular series of worm teeth provided thereon so as to thereby form said worm wheel.

27. An adjustable lumbar support according to claim 25, wherein said worm is mounted so as to be moveable around a path which is transverse of the rotational axis of the worm and is substantially radial of the rotational axis of the worm wheel, and resilient means resists movement of said worm along said path in one direction and urges the worm to move along said path in the direction opposite to said one direction so as to thereby cause said worm to cooperatively engage with the worm wheel.

28. An adjustable lumbar support for use with a seat backrest, said support including a flexible band having a longitudinal axis extending between two opposite ends of the band, each said end being attachable to a respective one of two sides of a said backrest, said band including two separate parts which are relatively moveable in the direction of said longitudinal axis so as to thereby vary the effective length of said band, each said part including a respective one of said ends, and drive means interconnecting the two said parts and being operable to cause said relative movement of said parts, said drive means including a cam which is rotatable relative to said band and which interacts with each of said parts so that said effective length is varied according to the rotational position of said cam relative to said parts, wherein a housing is attached to said band, said cam is contained in said housing, bearing means within said housing mounts said cam for rotation about the rotational axis thereof, and said beating means includes at least one radially outwardly facing surface which slideably engages a radially inwardly facing bearing surface of the cam, said radially inwardly facing surface being a surface adjacent to the radially outer periphery of the cam.

29. An adjustable lumbar support according to claim 28, wherein said cam is caused to rotate through a worm and a worm wheel drive connection, and said worm is contained in said housing.

30. An adjustable lumbar support according to claim 29, wherein a housing is attached to said band, at least part of said drive means is contained in said housing, and an actuator is mounted on said housing.

31. An adjustable lumbar support for use with a seat backrest, said support including a flexible band having a longitudinal axis extending between two opposite ends of the band, each said end being attachable to a respective one of two sides of a said backrest, said band including two separate parts which are relatively moveable in the direction of said longitudinal axis so as to thereby vary the effective length of the band, each said part including a respective one of said ends, and drive means interconnecting the two said inner ends and being operable to cause said relative movement of said parts, wherein said band includes a series of projections which are spaced apart in the longitudinal direction of said band, each said projection extends forwardly from a base of the projection to an outer surface thereof, and each said outer surface forms a respective part of a front surface of the band.

32. An adjustable lumbar support according to claim 31, wherein each said projection is a rib having its longitudinal axis extending transverse to the longitudinal axis of the band.

33. An adjustable lumbar support according to claim 32, wherein each said outer surface has a convex curvature in the longitudinal direction of the respective said rib and the apex of that curvature is substantially midway in the longitudinal direction of the rib.

34. An adjustable lumbar support according to claim 31, wherein the projection at each end of said series has a maximum distance between said base and said outer surface which is less than the corresponding said distance of at least one other said projection of the series.

35. An adjustable lumbar support according to claim 34, wherein there is a progressive decrease in said maximum distance on each side of a central region of said series.

36. An adjustable lumbar support according to claim 35, wherein at least two said projections are located within said central region.

* * * * *